(12) United States Patent
Maghsoodi

(10) Patent No.: US 10,647,556 B2
(45) Date of Patent: May 12, 2020

(54) HOIST CABLE SENSOR WITH DIFFERENTIAL DRIVE

(71) Applicant: Goodrich Corporation, Charlotte, NC (US)

(72) Inventor: Bejan Maghsoodi, Diamond Bar, CA (US)

(73) Assignee: Goodrich Corporation, Charlotte, NC (US)

( * ) Notice: Subject to any disclaimer, the term of this patent is extended or adjusted under 35 U.S.C. 154(b) by 75 days.

(21) Appl. No.: 16/149,413

(22) Filed: Oct. 2, 2018

(65) Prior Publication Data
US 2020/0102195 A1    Apr. 2, 2020

(51) Int. Cl.
*B66D 1/28* (2006.01)
*B66D 1/14* (2006.01)
*B64D 1/22* (2006.01)
*B66D 1/12* (2006.01)
*B66D 1/39* (2006.01)

(52) U.S. Cl.
CPC .................. *B66D 1/28* (2013.01); *B66D 1/14* (2013.01); *B64D 1/22* (2013.01); *B66D 1/12* (2013.01); *B66D 1/39* (2013.01)

(58) Field of Classification Search
CPC ........ B66D 1/12; B66D 1/14; B66D 1/22–24; B66D 1/28; B66D 1/39; B64D 1/22
See application file for complete search history.

(56) References Cited

U.S. PATENT DOCUMENTS

| 3,128,861 | A | * | 4/1964 | Trondsen ................. B66D 1/14 192/17 R |
| 9,914,625 | B2 | | 3/2018 | Maghsoodi |
| 9,994,432 | B2 | * | 6/2018 | Mahnken ................. B66D 1/14 |
| 10,017,364 | B2 | | 7/2018 | Flateland |
| 2016/0304212 | A1 | | 10/2016 | Larson |
| 2017/0166422 | A1 | * | 6/2017 | Mahnken ............... A62B 35/00 |

FOREIGN PATENT DOCUMENTS

| CN | 1111829 A | 11/1981 |
| CN | 203333208 U | 12/2013 |
| EP | 1977987 A1 | 10/2008 |
| EP | 3369693 A1 | 9/2018 |

OTHER PUBLICATIONS

Extended European Search Report for EP Application EP 19199542. 2, dated Feb. 28, 2020, pp. 5.

* cited by examiner

*Primary Examiner* — Sang K Kim
*Assistant Examiner* — Nathaniel L Adams
(74) *Attorney, Agent, or Firm* — Kinney & Lange, P.A.

(57) ABSTRACT

A hoist includes a cable deployment sensor to sense the length of a cable that is deployed from a cable drum of the hoist. The cable deployment sensor includes a stationary ring and a rotatable ring disposed coaxially on the cable drum axis. A cluster assembly is mounted to rotate about the cable drum axis simultaneously with the cable drum. The cluster assembly includes a cluster gear with a first gear engaging the stationary ring and a second gear engaging the rotatable ring. The second gear drives the rotatable ring about the cable drum axis, and the rotatable ring drives rotation of an input gear for a sensor assembly.

20 Claims, 6 Drawing Sheets

HOIST CABLE SENSOR WITH DIFFERENTIAL DRIVE

BACKGROUND

This disclosure relates generally to hoists. More particularly, this disclosure relates to rescue hoists for aircraft.

Rescue hoists deploy and retrieve a cable from a cable drum to hoist persons or cargo, and the rescue hoist may be mounted to an aircraft, such as a helicopter. The rescue hoist includes a drum off of which the cable is deployed. The cable drum rotates to spool or unspool the cable from the cable drum, with one end of the cable attached to the cable drum and the other end, which can include a hook or other device, deployed during operation. The length of cable that is currently deployed is an important parameter for the user to know during operation of rescue hoists. A deployment sensor is employed to determine the number of rotations of the cable drum, and a control system can calculate the deployed length based on the sensed number of rotations. Multi-turn transducers can directly sense the number of rotations, but a multiple turn transducer does not maintain the positional reading if power is lost. Single-turn transducers typically require complex planocentric drives or a bulky arrangement having multiple stages of gear reduction to achieve the high gear ratios required by the single-turn transducer.

SUMMARY

A hoist includes a cable drum rotatable about a cable drum axis; a frame supporting the cable drum; a stationary ring gear supported by the frame and disposed coaxial with the cable drum axis; a rotatable ring gear disposed coaxial with the cable drum axis; a cluster assembly mounted for rotation about the cable drum axis; and a sensor assembly supported by the frame. The cluster gear includes a first gear mounted on a shaft, the first gear interfacing with the stationary ring gear; and a second gear mounted on the shaft, the second gear interfacing with the rotatable ring gear such that the second gear drives rotation of the rotatable ring gear. Rotation of the rotatable ring gear about the cable drum axis provides an input to the sensor assembly.

A cable deployment sensing system includes a stationary ring gear having external teeth, a rotatable ring gear mounted coaxially with the stationary ring gear, a cluster assembly mounted for rotation about an axis, and a sensor assembly. The stationary ring gear is fixed such that the stationary ring gear does not rotate about the axis. The rotatable ring gear is capable of rotating about the axis. The cluster assembly includes a housing; and a cluster gear supported by the housing. The cluster gear includes a first gear mounted on a shaft, the first gear interfacing with the stationary ring gear; and a second gear mounted on the shaft, the second gear interfacing with the rotatable ring gear such that the second gear drives rotation of the rotatable ring gear. The sensor assembly includes a sensor input gear interfacing with the rotatable ring gear and fixed relative to the axis, wherein the rotatable ring gear drives rotation of the sensor input gear; and a single-turn transducer interfacing with the sensor input gear and configured to sense rotation of the sensor input gear.

DETAILED DESCRIPTION

Figure 1:
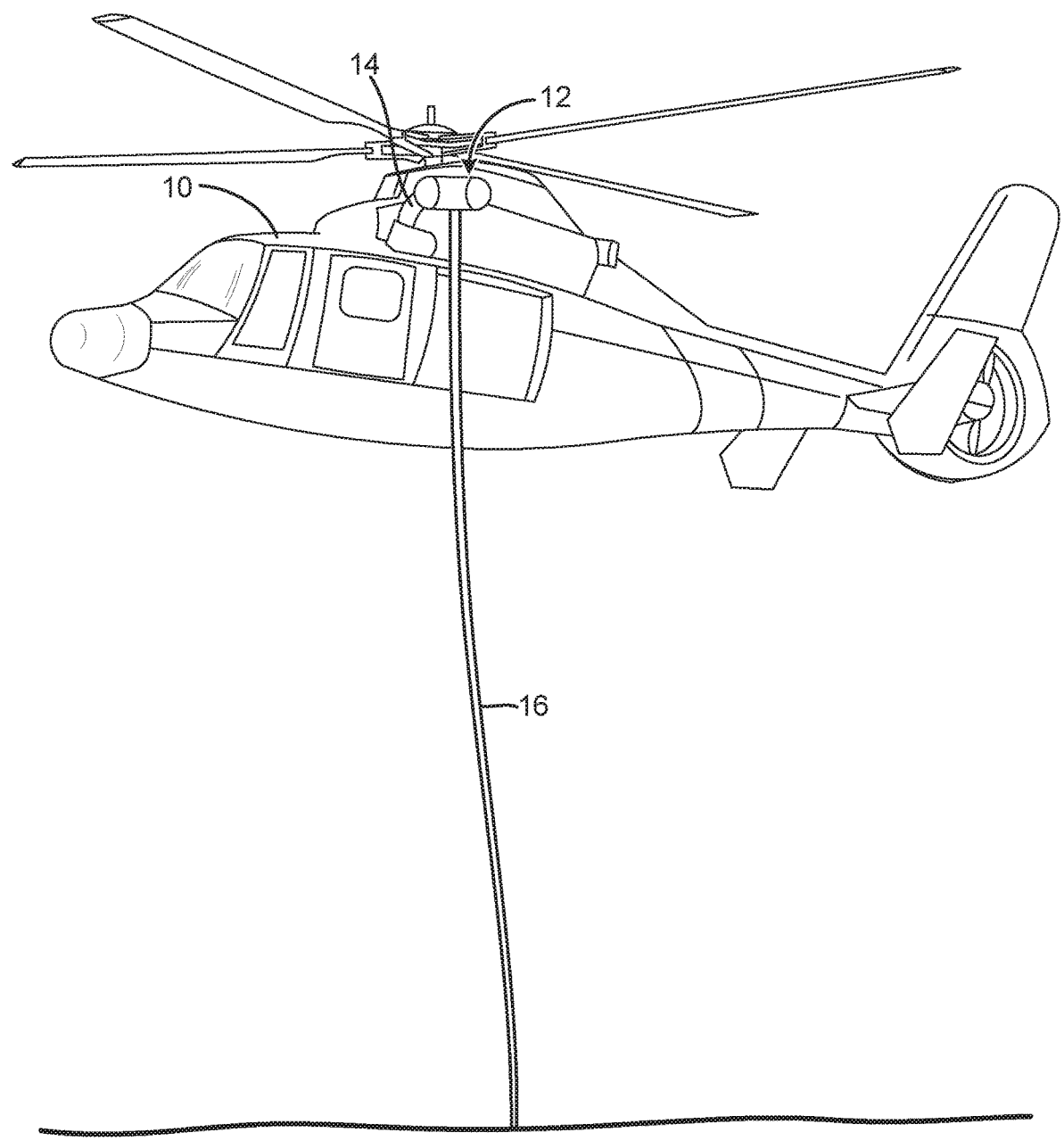
FIG. 1 is a perspective view of an aircraft and rescue hoist.

FIG. 1 is a perspective view of aircraft 10 and hoist 12. Hoist 12 is mounted to aircraft 10 by support 14. Cable 16 extends from hoist 12. During operation, cable 16 is raised and lowered to deploy and retrieve objects. Crew members of aircraft 10, such as the operator of hoist 12 and the pilot of aircraft 10, need to know the deployed length of cable 16 to ensure that cable 16 does not become entangled with an object on the ground, to ensure that cable 16 is properly stowed, and to perform certain maintenance tasks for hoist 12, among other reasons.

While hoist 12 is described as being supported by aircraft 10, it is understood that hoist 12 can be any desired hoist that deploys and retrieves a cable, such as cable 16, from a cable drum.

Figure 2A:
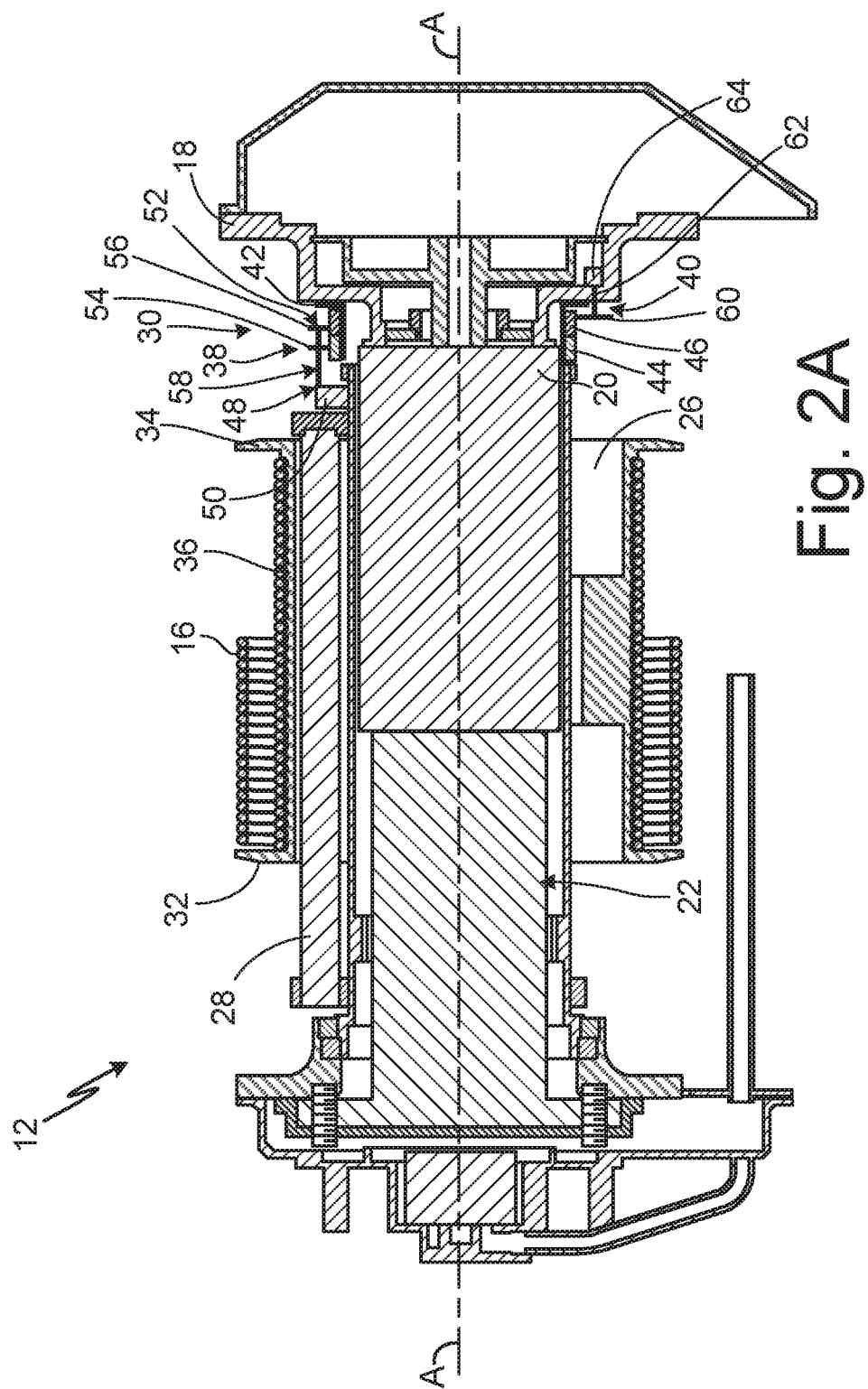
FIG. 2A is a cross-sectional view of a rescue hoist.
Figure 2B:
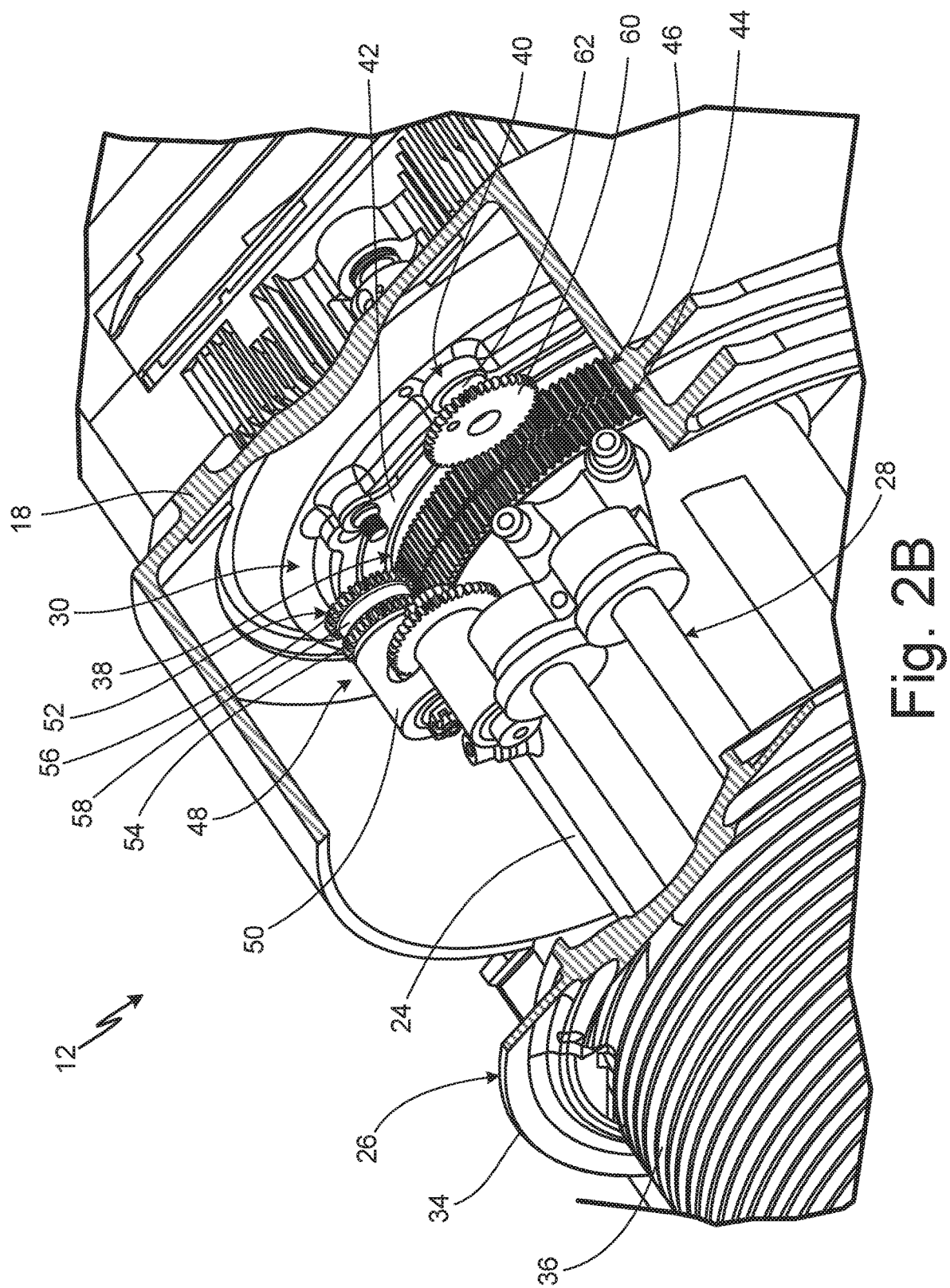
FIG. 2B is a partial cross-sectional view of a rescue hoist showing a cable deployment sensor.
Figure 2C:
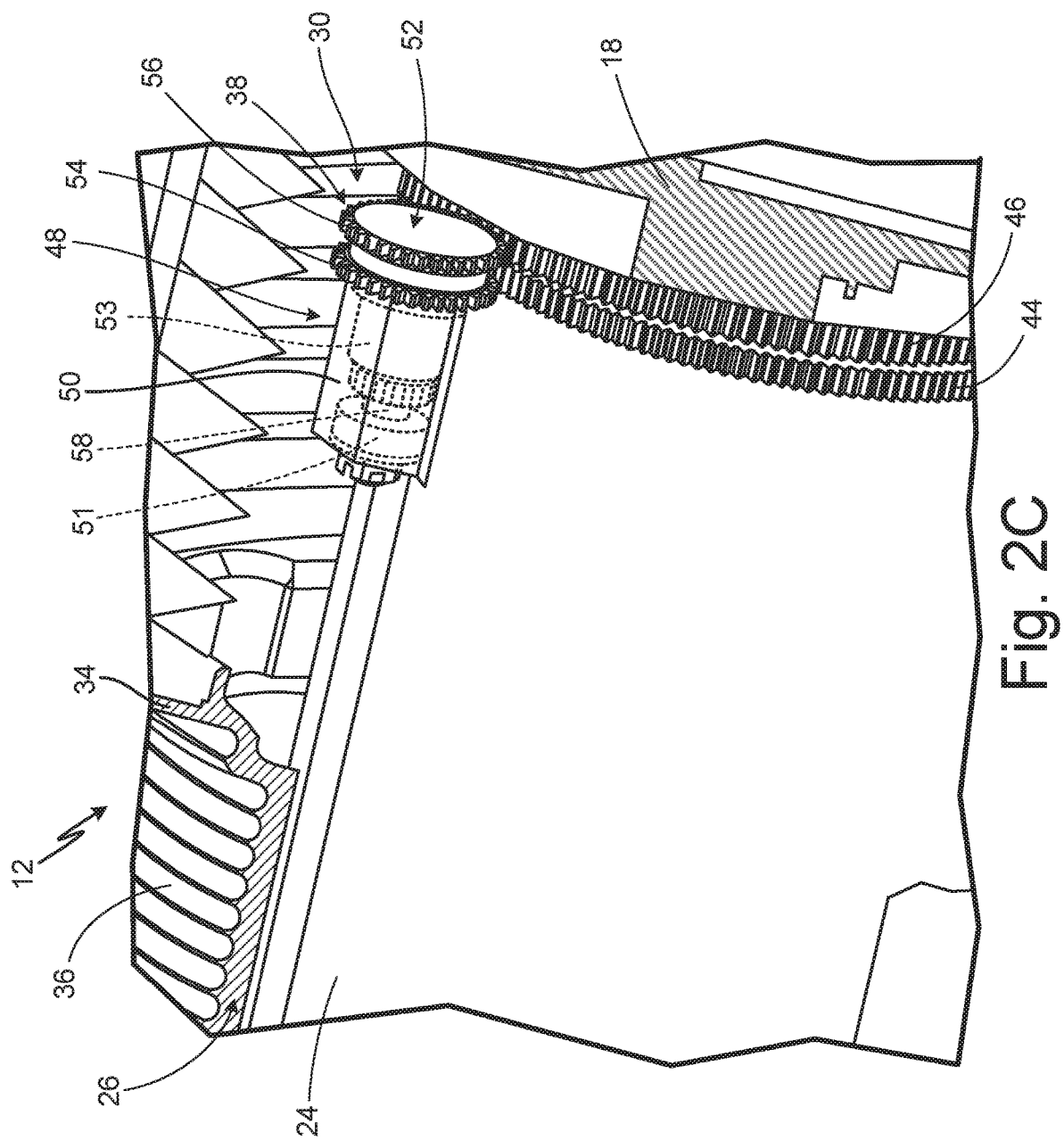
FIG. 2C is a perspective view showing a differential drive of a cable deployment sensor.

FIG. 2A is a cross-sectional view of hoist 12. FIG. 2B is a perspective view of hoist 12 with a portion of cable drum 26 removed to show elements of cable deployment sensor (CDS) 30. FIG. 2C is a perspective view of differential drive 38 of CDS 30. FIGS. 2A-2C will be discussed together. Hoist 12 includes cable 16 (FIGS. 2A-2B), frame 18, motor 20 (FIG. 2A), drive train 22 (FIG. 2A), linear bearing 24, cable drum 26, level wind mechanism 28 (FIGS. 2A-2B), and CDS 30. Cable drum 26 includes first flange 32 (FIG. 2A), second flange 34, and barrel 36. Barrel 36 extends between and connects first flange 32 and second flange 34. CDS 30 includes differential drive 38, sensor assembly 40 (FIGS. 2A-2B), and mounting flange 42 (FIGS. 2A-2B). Differential drive 38 includes stationary ring gear 44, rotatable ring gear 46, and cluster assembly 48. Cluster assembly 48 includes housing 50, first bearing 51 (FIG. 2C), cluster gear 52, and second bearing 53 (FIG. 2C). Cluster gear 52 includes first gear 54, second gear 56, and shaft 58. Sensor assembly 40 includes sensor input gear 60 (FIGS. 2A-2B), input shaft 62 (FIGS. 2A-2B), and transducer 64 (FIG. 2A).

Cable 16 wraps around barrel 36 of cable drum 26 and is retained between first flange 32 and second flange 34. Linear bearing 24 is rotatably mounted to frame 18. Motor 20 extends from frame 18 and is disposed within linear bearing 24. Drive train 22 is connected to motor 20 and supported by frame 18. Drive train 22 drives rotation of linear bearing 24. Cable drum 26 is mounted to linear bearing 24. Level wind mechanism 28 is also mounted to linear bearing 24, extends through cable drum 26, and is connected to cable drum 26 to drive translation of cable drum 26 along cable drum axis A-A. Cable 16 is in a cable-deployed state when cable 16 is fully deployed from cable drum 26, and cable 16 is in a cable-retracted state when cable 16 is fully retracted onto cable drum 26.

CDS 30 senses the deployed length of cable 16 and can be configured to communicate that information to a user. Mounting flange 42 is connected to frame 18. Stationary ring gear 44 is supported by mounting flange 42 and is disposed circumferentially about cable drum axis A-A. Stationary ring gear 44 is fixed relative to cable drum axis A-A to prevent stationary ring gear 44 from rotating about cable drum axis A-A. Rotatable ring gear 46 is supported by mounting flange 42 and is disposed circumferentially about cable drum axis A-A. Rotatable ring gear 46 is free to rotate about cable drum axis A-A. In some examples, a portion of stationary ring gear 44 extends under rotatable ring gear 46 and forms a race that rotatably supports rotatable ring gear 46. In some examples, a portion of mounting flange 42 extends under and rotatably supports rotatable ring gear 46. It is understood, however that rotatable ring gear 46 can be rotatably supported in any desired manner, so long as rotatable ring gear 46 is coaxial with cable drum axis A-A.

Cluster assembly 48 is supported on linear bearing 24 and is configured to rotate with linear bearing 24 about cable drum axis A-A. Housing 50 of cluster gear 52 is mounted on linear bearing 24. First bearing 51 and second bearing 53 are disposed in housing 50. Shaft 58 is rotatably supported by first bearing 51 and second bearing 53, and shaft 58 extends from housing 50. First gear 54 and second gear 56 are disposed coaxially on shaft 58. First gear 54 is intermeshed with stationary ring gear 44, and second gear 56 is intermeshed with rotatable ring gear 46. In the example shown, shaft 58 extends from housing 50 such that first gear 54 and second gear 56 are cantilevered from housing 50. It is understood, however, that shaft 58, first gear 54, and second gear 56 can be disposed relative to housing 50 in any desired manner. In addition, while cluster assembly 48 is described as mounted on linear bearing 24, it is understood that cluster assembly 48 can be directly mounted to cable drum 26 in examples where cable drum 26 does not translate along cable drum axis A-A. Sensor input gear 60 is intermeshed with rotatable ring gear 46 such that rotatable ring gear 46 drives rotation of sensor input gear 60.

Input shaft 62 extends from sensor input gear 60 into frame 18. Input shaft 62 extends to transducer 64. Transducer 64 is mounted to frame 18 and is configured to sense rotation of input shaft 62. The rotation of sensor input gear 60, and thus input shaft 62, is directly proportional to the rotation of cable drum 26. Transducer 64 is a single-turn transducer configured to communicate the position of input shaft 62 to a cable deployment calculator. The cable deployment calculator can include instructions stored on a memory that, when executed by control circuitry, convert the positional information of input shaft 62 into a length of cable 16 deployed from cable drum 26. As such, transducer 64 can be of any suitable form for sensing the rotation of input shaft 62, such as a single turn Hall Effect sensor or a potentiometer, among other options.

Differential drive 38 provides a reduction drive between the rotation of linear bearing 24 and the rotation of sensor input gear 60 such that sensor input gear 60 rotates less than or equal to 360-degrees between cable 16 being in the cable-deployed state and the cable-retracted state. A single-turn transducer does not lose the position of input shaft 62 when power is removed from transducer 64. Transducer 64 thus maintains the positional information of cable 16 even where there is a loss of power to rescue hoist 12. As such, CDS 30 maintains the positional information and can communicate that information to the user when power to rescue hoist 12 is restored. In examples where cable drum 26 can be manually rotated during a power loss, CDS 30 still tracks the deployment of cable 16, as any rotation of cable drum 26 is transmitted to sensor input gear 60 by differential drive 38.

During operation, motor 20 is activated and provides rotational power to drive train 22. Drive train 22 is a gear reduction drive. Drive train 22 outputs rotational power to linear bearing 24, thereby causing linear bearing 24 to rotate about cable drum axis A-A. In one embodiment, linear bearing 24 is a ball spline bearing, such that linear bearing 24 transmits torque to cable drum 26 to drive the rotation of cable drum 26 about cable drum axis A-A.

Level wind mechanism 28 is mounted to linear bearing 24 and rotates about cable drum axis A-A with linear bearing 24. Level wind mechanism 28 includes a level wind screw that is intermeshed with a follower mounted on cable drum 26. The rotation of linear bearing 24 drives rotation of the level wind screw, and the level wind screw causes cable drum 26 to translate along cable drum axis A-A due to the connection of the level wind screw and the follower.

Cluster assembly 48 rotates about cable drum axis A-A along with linear bearing 24. As cluster assembly 48 rotates about cable drum axis A-A, first gear 54 is driven by stationary ring gear 44. The rotation of first gear 54 drives rotation of shaft 58, thereby driving second gear 56. Second gear 56 drives rotation of rotatable ring gear 46 about cable drum axis A-A, and rotatable ring gear 46 drives rotation of sensor input gear 60. The interconnection of first gear 54 and stationary ring gear 44 has a first gear ratio. The interconnection of second gear 56 and stationary ring gear 44 has a second gear ratio. The first gear ratio and the second gear ratio combine to provide a total input ratio between linear bearing 24 and rotatable ring gear 46 of between 400:1 and 550:1. In a particular example, the total ratio is between 450:1 and 500:1. In one example, second gear 56 has a greater number of teeth than first gear 54, and rotatable ring gear 46 has a greater number of teeth than stationary ring gear 44. An output ratio between rotatable ring gear 46 and sensor input gear 60 is between about 3:1 and 3.5:1. The total ratio, which is a combination of the input ratio and the output ratio, ensures that sensor input gear 60 rotates less than 360-degrees from the point where cable 16 is in the fully-stowed position to the point where cable 16 is in the fully-deployed position. For example, where cable drum 26 rotates 160 total rotations between the fully-stowed position and the fully-deployed position, CDS 30 is configured such that the total ratio is greater than or equal to 160:1. Transducer 40 can communicate the position of input shaft 62 to the cable deployment calculator, which calculates the true length of the cable deployed based on the change in position of input shaft 62 relative to the position of input shaft 62 when cable 16 is in either the cable-deployed state or the cable-retracted state.

CDS 30 provides significant advantages. Transducer 64 is a single-turn transducer such that transducer 64 maintains the deployed length of cable 16 even where power to hoist 12 is lost. CDS 30 provides a simple, compact reduction drive between linear bearing 24 and sensor input gear 60. The total ratio ensures that sensor input gear 60 advances less than a full rotation between the point where cable 16 is in the fully-stowed position to the point where cable 16 is in the fully-deployed position. The compact arrangement of CDS 30 reduces the weight of hoist 12 and provides a relatively simple arrangement for tracking the deployed length of cable 16.

Figure 3:
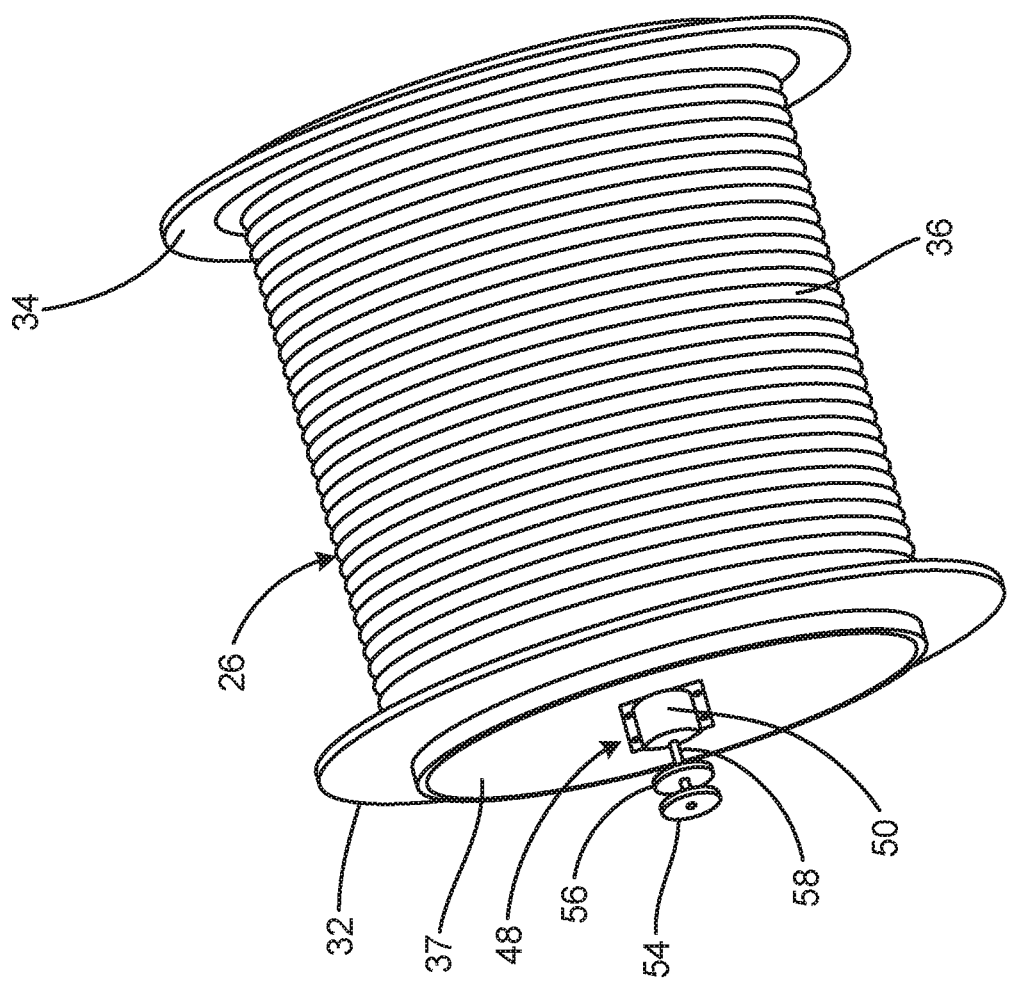
FIG. 3 is a perspective view of a cluster assembly mounted directly to a cable drum.

FIG. 3 is a perspective view of cluster assembly 48 mounted directly to cable drum 26. Housing 50 and cluster gear 52 of cluster assembly 48 are shown. Cluster gear 52 includes first gear 54, second gear 56, and shaft 58.

In some examples, cable drum 26 is configured to rotate about cable drum axis A-A but is fixed such that cable drum 26 does not translate relative to cable drum axis A-A. In such an example, a translating payout point for cable 16 (shown in FIGS. 1 and 2A) ensures that cable 16 is level-wound onto cable drum 26. A drive train, such as drive train 22 (shown in FIG. 2A), is directly connected to barrel 36 of cable drum 26 to cause cable drum 26 to rotate about cable drum axis A-A. Level wind mechanism 28 (shown in FIGS. 2A-2B) is meshed with the translating payout mechanism to drive oscillation of the translating payout point.

Housing 50 of cluster assembly 48 is directly mounted to inner side 37 of barrel 36. As such, cable drum 26 rotating about cable drum axis A-A also causes cluster assembly 48 to rotate about cable drum axis A-A. Stationary ring gear 44 (best seen in FIG. 4), rotatable ring gear 46 (best seen in FIG. 4), sensor assembly 40 (best seen in FIG. 2A), and mounting flange 42 (best seen in FIG. 4) are disposed in the same manner as shown in FIGS. 2A and 2B. Stationary ring gear 44 causes first gear 54 to rotate, which causes shaft 58 to rotate. Second gear 56 rotates with shaft 58, and second gear 56 drives the rotation of rotatable ring gear 46 about cable drum axis A-A. The input ratio, output ratio, and total ratio are the same as where cluster assembly 48 is mounted to linear bearing 24. As such, CDS 30 provides the same advantages whether CDS 30 is disposed in a hoist having a translating cable drum, such as hoist 12 (shown in FIGS. 2A-2B), or a hoist having a fixed cable drum.

Figure 4:
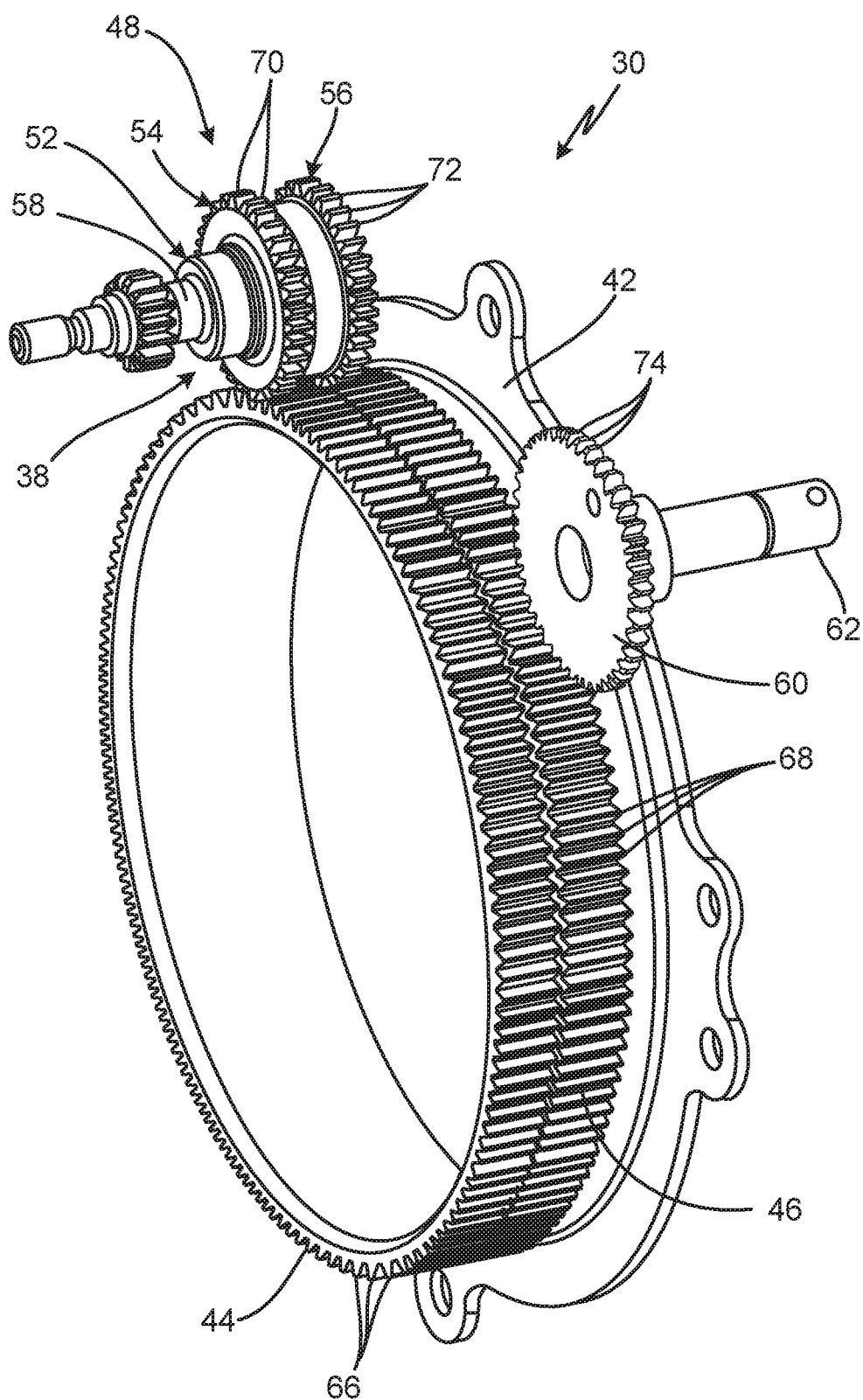
FIG. 4 is a perspective view of a cable deployment sensor.

FIG. 4 is a perspective view of CDS 30. Differential drive 38, sensor input gear 60 of sensor assembly 40, and mounting flange 42 are shown. Differential drive 38 includes stationary ring gear 44, rotatable ring gear 46, and cluster assembly 48. Cluster gear 52 of cluster assembly 48 is shown. Cluster gear 52 includes first gear 54, second gear 56, and shaft 58. Sensor input gear 60 and input shaft 62 of sensor assembly 40 are shown. Stationary ring gear 44 includes stationary ring teeth 66. Rotatable ring gear 46 includes rotatable ring teeth 68. First gear 54 includes first gear teeth 70. Second gear 56 includes second gear teeth 72. Sensor input gear 60 includes input gear teeth 74.

A housing of cluster gear 52, such as housing 50 (shown in FIGS. 2A-3), is attached, either directly or indirectly, to cable drum 26 such that housing 50 and cluster gear 52 rotate about cable drum axis A-A. Mounting flange 42 is connected to a grounded component of a rescue hoist, such as a frame of the rescue hoist. Stationary ring gear 44 is supported by mounting flange 42 and fixed relative to cable drum axis A-A such that stationary ring gear 44 does not rotate about cable drum axis A-A. Rotatable ring gear 46 is supported by mounting flange 42 and is in a floating arrangement such that rotatable ring gear 46 can rotate about cable drum axis A-A. Cluster gear 52 is connected to both stationary ring gear 44 and rotatable ring gear 46. First gear 54 and second gear 56 are disposed coaxially on shaft 58. Stationary ring gear 44 drives rotation of cluster gear 52 and cluster gear 52 drives rotation of rotatable ring gear 46. Sensor input gear 60 is intermeshed with rotatable ring gear 46 such that rotatable ring gear 46 drives the rotation of sensor input gear 60. Input shaft 62 extends to a single-turn transducer, such as transducer 64 (shown in FIG. 2A), that senses the rotation of input shaft 62. The transducer is configured to provide positional information regarding input shaft 62 to a cable deployment calculator, and the cable deployment calculator can calculate the deployed length of a cable based on the position of input shaft 62.

During operation, CDS 30 provides a total reduction ratio between rotation of the cable drum and rotation of sensor input gear 60 such that sensor input gear 60 rotates less than or equal to 360-degrees from the point where the cable is fully stowed on the cable drum and the point where the cable is fully deployed from the cable drum. The housing of cluster assembly rotates about cable drum axis A-A as the cable drum is driven about cable drum axis A-A. The housing of cluster assembly 48 carries cluster gear 52 such that cluster gear completes a full rotation about cable drum axis A-A for each rotation of the cable drum about cable drum axis A-A.

First gear teeth 70 of first gear 54 are intermeshed with stationary ring teeth 66 of stationary ring gear 44 such that stationary ring gear 44 drives rotation of first gear 54 as cluster assembly 48 rotates about cable drum axis A-A. First gear 54 drives rotation of shaft 58, and shaft 58 drives rotation of second gear 56. Second gear teeth 72 of second gear 56 are intermeshed with rotatable ring teeth 68, such that second gear 56 drives rotation of rotatable ring gear 46 about cable drum axis A-A. Rotatable ring teeth 68 are intermeshed with input gear teeth 74 such that rotatable ring gear 46 drives rotation of sensor input gear 60.

The interconnection of first gear 54 and stationary ring gear 44 has a first gear ratio. The interconnection of second gear 56 and stationary ring gear 44 has a second gear ratio. The first gear ratio and the second gear ratio combine to provide a total input ratio between linear bearing 24 and rotatable ring gear 46 of between 400:1 and 550:1. In a particular example, the total ratio is between 450:1 and 500:1. In one example, second gear 56 has a greater number of teeth than first gear 54, and rotatable ring gear 46 has a greater number of teeth than stationary ring gear 44. An output ratio between rotatable ring gear 46 and sensor input gear 60 is between about 3:1 and 3.5:1. The total ratio, which is a combination of the input ratio and the output ratio, ensures that sensor input gear 60 rotates less than 360-degrees from the point where cable 16 is in the fully-stowed position to the point where cable 16 is in the fully-deployed position. For example, where cable drum 26 rotates 160 total rotations between the fully-stowed position and the fully-deployed position, CDS 30 is configured such that the total ratio is greater than or equal to 160:1. In one example, first gear 54 includes thirty-two first gear teeth 70 and has a pitch of thirty-two, stationary ring gear 44 includes 140 stationary ring teeth 66, second gear 56 includes thirty-four second gear teeth 72 and has a pitch of thirty-four, and rotatable ring gear 46 includes 149 rotatable ring teeth 68. In such an example the gear ratio between first gear 54 and stationary ring gear 44 is 32:140, and the gear ratio between second gear 56 and rotatable ring gear 46 is 34:149. The gear ratios and epicyclic movement of cluster assembly 48 causes rotatable ring gear 46 to advance about 0.17% of a rotation for each rotation of cluster assembly 48 about cable drum axis A-A. With cable drum 26 configured to rotate 160 revolutions between the fully-stowed position and the fully-deployed position, the gear ratio causes rotatable ring gear 46 to advance about 0.27 of a full revolution. In such an example, sensor input gear 60 can have forty-three input gear teeth 74. Sensor input gear 60 would thus advance 0.93 of a full revolution between the fully-stowed position and the fully-deployed position due to the gear ratio between sensor input gear 60 and rotatable ring gear 46.

CDS 30 provides a compact, simple arrangement for transmitting the rotation of the cable drum to sensor assembly 40. The compact arrangement reduces the weight of the rescue hoist and allows CDS 30 to be implemented in either a rescue hoist having a translating cable drum or a rescue hoist having a fixed cable drum. In addition, the simple arrangement of CDS 30 reduces the downtime required for any maintenance.

Discussion of Possible Embodiments

The following are non-exclusive descriptions of possible embodiments of the present invention.

A hoist includes a cable drum rotatable about a cable drum axis; a frame supporting the cable drum; a stationary ring gear supported by the frame and disposed coaxial with the cable drum axis; a rotatable ring gear disposed coaxial with the cable drum axis; a cluster assembly mounted for rotation about the cable drum axis; and a sensor assembly supported by the frame. The cluster gear includes a first gear mounted on a shaft, the first gear interfacing with the stationary ring gear; and a second gear mounted on the shaft, the second gear interfacing with the rotatable ring gear such that the second gear drives rotation of the rotatable ring gear. Rotation of the rotatable ring gear about the cable drum axis provides an input to the sensor assembly.

The hoist of the preceding paragraph can optionally include, additionally and/or alternatively, any one or more of the following features, configurations and/or additional components:

The housing of the cluster assembly is mounted on an interior of a barrel of the cable drum.

A linear bearing supported by the frame, wherein the cable drum is supported by the linear bearing, and the housing of the cluster assembly is mounted on the linear bearing.

A first gear ratio between the first gear and the stationary ring gear is larger than a second gear ratio between the second gear and the rotatable ring gear.

The first gear ratio is 32:140 and the second gear ratio is 34:149.

The first gear includes thirty-two teeth and has a pitch of thirty-two, and wherein the second gear includes thirty-four teeth and has a pitch of thirty-four.

The sensor assembly includes a sensor input gear intermeshed with the rotatable ring gear; a sensor shaft extending from the sensor input gear through the frame; and a transducer interfacing with the sensor shaft and configured to sense rotation of the sensor shaft.

The transducer is a single-turn transducer.

The single-turn transducer is selected from the group consisting of a potentiometer and a single turn Hall Effect sensor.

An output ratio between the rotatable ring gear and the sensor input gear is between 2.5:1 and 4:1.

The output ratio between the rotatable ring gear and the sensor input gear is between 3:1 and 3.5:1.

A total input ratio between rotation of the cable drum about the cable drum axis and rotation of the rotatable ring gear about the cable drum axis is between 400:1 and 550:1.

The total input ratio is between 450:1 and 500:1.

The shaft of the cluster gear extends from the housing of the cluster gear and the first gear and the second gear are cantilevered from the housing.

A cable deployment sensing system includes a stationary ring gear having external teeth, a rotatable ring gear mounted coaxially with the stationary ring gear, a cluster assembly mounted for rotation about an axis, and a sensor assembly. The stationary ring gear is fixed such that the stationary ring gear does not rotate about the axis. The rotatable ring gear is capable of rotating about the axis. The cluster assembly includes a housing; and a cluster gear supported by the housing. The cluster gear includes a first gear mounted on a shaft, the first gear interfacing with the stationary ring gear; and a second gear mounted on the shaft, the second gear interfacing with the rotatable ring gear such that the second gear drives rotation of the rotatable ring gear. The sensor assembly includes a sensor input gear interfacing with the rotatable ring gear and fixed relative to the axis, wherein the rotatable ring gear drives rotation of the sensor input gear; and a single-turn transducer interfacing with the sensor input gear and configured to sense rotation of the sensor input gear.

The cable deployment sensing system of the preceding paragraph can optionally include, additionally and/or alternatively, any one or more of the following features, configurations and/or additional components:

The first gear has a first number of gear teeth and the second gear has a second number of gear teeth, and wherein the first number is less than the second number.

The stationary ring gear has a third number of gear teeth and the rotatable ring gear has a fourth number of gear teeth, and wherein the third number is less than the fourth number.

The first gear and the second gear are coaxial.

The shaft of the cluster assembly extends from the housing of the cluster assembly such that the first gear and the second gear are cantilevered relative to the housing of the cluster assembly.

The sensor assembly further comprises a sensor shaft extending from the sensor input gear, and wherein the single-turn transducer interfaces with the sensor shaft to sense rotation of the sensor shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hoist comprising:
   a cable drum rotatable about a cable drum axis;
   a frame supporting the cable drum;
   a stationary ring gear supported by the frame and disposed coaxial with the cable drum axis;
   a rotatable ring gear disposed coaxial with the cable drum axis;
   a cluster assembly mounted for rotation about the cable drum axis, the cluster assembly comprising:
      a housing; and
      a cluster gear supported by the housing, the cluster gear comprising:
         a first gear mounted on a shaft, the first gear interfacing with the stationary ring gear; and
         a second gear mounted on the shaft, the second gear interfacing with the rotatable ring gear such that the second gear drives rotation of the rotatable ring gear; and
   a sensor assembly supported by the frame, wherein rotation of the rotatable ring gear about the cable drum axis provides an input to the sensor assembly.

2. The hoist of claim 1, wherein the housing of the cluster assembly is mounted on an interior of a barrel of the cable drum.

3. The hoist of claim 1, further comprising:
   a linear bearing supported by the frame, wherein the cable drum is supported by the linear bearing;
   wherein the housing of the cluster assembly is mounted on the linear bearing.

4. The hoist of claim 1, wherein a first gear ratio between the first gear and the stationary ring gear is larger than a second gear ratio between the second gear and the rotatable ring gear.

5. The hoist of claim 4, wherein the first gear ratio is 32:140 and the second gear ratio is 34:149.

6. The hoist of claim 4, wherein the first gear includes thirty-two teeth and has a pitch of thirty-two, and wherein the second gear includes thirty-four teeth and has a pitch of thirty-four.

7. The hoist of claim 1, wherein the sensor assembly comprises:
- a sensor input gear intermeshed with the rotatable ring gear;
- a sensor shaft extending from the sensor input gear through the frame; and
- a transducer interfacing with the sensor shaft and configured to sense rotation of the sensor shaft.

8. The hoist of claim 7, wherein the transducer is a single-turn transducer.

9. The hoist of claim 8, wherein the single-turn transducer is selected from the group consisting of a potentiometer and a single turn Hall Effect sensor.

10. The hoist of claim 7, wherein an output ratio between the rotatable ring gear and the sensor input gear is between 2.5:1 and 4:1.

11. The hoist of claim 10, wherein the output ratio between the rotatable ring gear and the sensor input gear is between 3:1 and 3.5:1.

12. The hoist of claim 1, wherein a total input ratio between rotation of the cable drum about the cable drum axis and rotation of the rotatable ring gear about the cable drum axis is between 400:1 and 550:1.

13. The hoist of claim 12, wherein the total input ratio is between 450:1 and 500:1.

14. The hoist of claim 1, wherein the shaft of the cluster gear extends from the housing of the cluster gear and the first gear and the second gear are cantilevered from the housing.

15. A cable deployment sensing system comprising:
- a stationary ring gear having external teeth, wherein the stationary ring gear is fixed such that the stationary ring gear does not rotate about an axis;
- a rotatable ring gear mounted coaxially with the stationary ring gear, the rotatable ring gear capable of rotating about the axis;
- a cluster assembly mounted for rotation about the axis, the cluster assembly comprising:
  - a housing; and
  - a cluster gear supported by the housing, the cluster gear comprising:
    - a first gear mounted on a shaft, the first gear interfacing with the stationary ring gear; and
    - a second gear mounted on the shaft, the second gear interfacing with the rotatable ring gear such that the second gear drives rotation of the rotatable ring gear; and
- a sensor assembly comprising:
  - a sensor input gear interfacing with the rotatable ring gear and fixed relative to the axis, wherein the rotatable ring gear drives rotation of the sensor input gear; and
  - a single-turn transducer interfacing with the sensor input gear and configured to sense rotation of the sensor input gear.

16. The cable deployment sensing system of claim 15, wherein the first gear has a first number of gear teeth and the second gear has a second number of gear teeth, and wherein the first number is less than the second number.

17. The cable deployment sensing system of claim 16, wherein the stationary ring gear has a third number of gear teeth and the rotatable ring gear has a fourth number of gear teeth, and wherein the third number is less than the fourth number.

18. The cable deployment sensing system of claim 15, wherein the first gear and the second gear are coaxial.

19. The cable deployment sensing system of claim 15, wherein the shaft of the cluster assembly extends from the housing of the cluster assembly such that the first gear and the second gear are cantilevered relative to the housing of the cluster assembly.

20. The cable deployment sensing system of claim 15, wherein the sensor assembly further comprises a sensor shaft extending from the sensor input gear, and wherein the single-turn transducer interfaces with the sensor shaft to sense rotation of the sensor shaft.

* * * * *